United States Patent
Kajiwara et al.

(10) Patent No.: US 9,562,629 B2
(45) Date of Patent: Feb. 7, 2017

(54) BAND CLIP, BAND-CLIP-EQUIPPED WIRE HARNESS, AND ASSEMBLY

(71) Applicant: SUMITOMO WIRING SYSTEMS, LTD., Mie (JP)

(72) Inventors: Yasuhiro Kajiwara, Mie (JP); Eriko Murata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/779,450

(22) PCT Filed: Mar. 24, 2014

(86) PCT No.: PCT/JP2014/057982
§ 371 (c)(1),
(2) Date: Sep. 23, 2015

(87) PCT Pub. No.: WO2014/167987
PCT Pub. Date: Oct. 16, 2014

(65) Prior Publication Data
US 2016/0046245 A1    Feb. 18, 2016

(30) Foreign Application Priority Data

Apr. 12, 2013    (JP) .................................. 2013-083744

(51) Int. Cl.
*B60R 16/02*    (2006.01)
*F16L 3/137*    (2006.01)
(Continued)

(52) U.S. Cl.
CPC ............... *F16L 3/137* (2013.01); *B60N 3/042* (2013.01); *B60N 3/046* (2013.01);
(Continued)

(58) Field of Classification Search
CPC .......... F16L 3/137; F16L 3/233; F16L 3/2332; F16L 3/2334; F16L 3/2336; F16L 3/2338; B60R 16/00; B60R 16/0215; B60N 3/042; H02G 3/30; Y10T 24/1498
(Continued)

(56) References Cited

U.S. PATENT DOCUMENTS 5,131,613 A * 7/1992 Kamiya ................... F16L 3/233
                                                           24/16 PB
5,319,839 A * 6/1994 Shimajiri ............... F16B 21/086
                                                           24/297
(Continued)

FOREIGN PATENT DOCUMENTS

JP    07-001384    1/1995
JP    2000-095011    4/2000
(Continued)

OTHER PUBLICATIONS

Machine Translation of Miyashita (JP 2006-348999 A), retrieved from EPO on Jan. 3, 2016.*
(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

Provided is a band clip according to which projection from a sheet-shaped object is suppressed. The band clip includes a bundling band and a clip. The bundling band includes a head and a strap. The clip includes a button, a shaft, and a penetration inhibitor. One end of the shaft is bonded to one main surface of the button. The other end of the shaft is bonded to one main surface of the penetration inhibitor. The head is bonded to the other main surface of the penetration inhibitor. In a view from the direction in which the shaft (Continued)

extends, the button is larger than the shaft and the penetration inhibitor is larger than the button.

2 Claims, 5 Drawing Sheets

(51) Int. Cl.
    *H02G 3/32*      (2006.01)
    *B60N 3/04*      (2006.01)
    *F16B 2/22*      (2006.01)

(52) U.S. Cl.
    CPC ............ *B60R 16/0215* (2013.01); *F16B 2/22* (2013.01); *H02G 3/32* (2013.01)

(58) Field of Classification Search
    USPC ....... 248/68.1, 71, 74.1, 74.2, 74.3; 24/16 R, 24/16 PB, 17 AP; 296/97.23, 208
    See application file for complete search history.

(56) References Cited

U.S. PATENT DOCUMENTS

| | | | | |
|---|---|---|---|---|
| 5,921,510 | A * | 7/1999 | Benoit | F16L 3/2334 248/68.1 |
| 6,280,130 | B1 | 8/2001 | Haraguchi et al. | |
| D456,699 | S * | 5/2002 | Nakanishi | D8/382 |
| 6,497,003 | B2 * | 12/2002 | Calabrese | B60N 3/046 16/4 |
| 6,813,865 | B2 * | 11/2004 | Peterson | B60R 13/0206 296/39.1 |
| 7,614,836 | B2 * | 11/2009 | Mohiuddin | B60R 13/0206 411/508 |
| 7,762,503 | B2 * | 7/2010 | Franks | F16L 3/233 24/16 PB |
| 7,775,484 | B2 * | 8/2010 | Gunzburger | B60R 16/0215 248/74.3 |
| 7,793,895 | B2 * | 9/2010 | Franks | F16B 19/00 24/16 PB |
| 8,322,782 | B2 * | 12/2012 | Shallcross | B60R 16/0215 24/297 |
| 8,814,268 | B2 * | 8/2014 | Mineta | B60N 2/5825 297/228.13 |
| 8,883,059 | B2 * | 11/2014 | Lewis | F16B 5/065 264/250 |
| 8,931,162 | B2 * | 1/2015 | Gonzalez | B60N 3/042 16/4 |
| 9,212,677 | B2 * | 12/2015 | Owen | F16L 3/2332 |
| 2016/0027553 | A1 * | 1/2016 | Murao | H01R 13/73 174/72 A |
| 2016/0046245 | A1 * | 2/2016 | Kajiwara | H02G 3/32 248/71 |
| 2016/0047494 | A1 * | 2/2016 | Dickinson | B60R 16/0215 248/74.2 |
| 2016/0121821 | A1 * | 5/2016 | Suzuki | B60N 3/046 296/97.23 |

FOREIGN PATENT DOCUMENTS

| | | |
|---|---|---|
| JP | 2006-348999 | 12/2006 |
| JP | 2010173475 A * | 8/2010 |
| JP | 2011-213172 | 10/2011 |

OTHER PUBLICATIONS

International Search Report in PCT/JP2014/057982 Patent Application No. , dated Jun. 24, 2012.

* cited by examiner

BAND CLIP, BAND-CLIP-EQUIPPED WIRE HARNESS, AND ASSEMBLY

TECHNICAL FIELD

The present invention relates to a band clip, a band-clip-equipped wire harness, and an assembly.

BACKGROUND ART

If a wire harness and a floor carpet are to be attached to a vehicle body of an automobile or the like, normally, a band-clip-equipped wire harness and a floor carpet are prepared, the band-clip-equipped wire harness is attached to the vehicle body, and the floor carpet is attached to the vehicle body on top of the band-clip-equipped wire harness.

With the invention disclosed in Patent Document 1, a wire harness is bundled by a bundling band (harness retaining portion) of the band clip (carpet fastener), and the clip (locking protrusion) of the band clip is bonded to the floor carpet (carpet), whereby an assembly of the band clip, wire harness, and floor carpet is prepared. The assembly is attached to the vehicle body (paragraph 0042).

CITATION LIST

Patent Document

Patent Document 1: JP 2011-213172A

SUMMARY OF INVENTION

Technical Problem

It takes many man-hours to perform the task of separately preparing the band-clip-equipped wire harness and the floor carpet and attaching them to the vehicle body. This problem is solved by preparing an assembly of the band clip, the wire harness, and the floor carpet as described in Patent Document 1 and attaching the assembly to the vehicle body.

However, with the assembly described in Patent Document 1, a "locking flange 4b" arranged on the vehicle cabin side is not flat, and therefore projection of the "locking flange 4b" into the vehicle cabin is problematic. Also, if a load from the vehicle cabin side to the vehicle body side is applied to the floor carpet, a portion or the entirety of the "locking flange 4b" arranged on the vehicle body side moves from the vehicle body side to the vehicle cabin side, and the projection of the "locking flange 4b" into the vehicle cabin becomes more prominent. This problem occurs also in cases where a linear object other than the wire harness is bundled by the bundling band, cases where the clip is bonded to a sheet-shaped object other than the floor carpet, and the like.

The present invention is made to solve the foregoing problems. A problem to be solved by the invention is that of providing a band clip according to which projection from a sheet-shaped object is suppressed.

Solution to Problem

First and second aspects of the invention relate to a band clip.

In the first aspect of the invention, a bundling band and a clip are provided. The bundling band includes a head and a strap. The clip includes a first plate-shaped object, a second plate-shaped object, and a shaft-shaped object. One end of the shaft is bonded to one main surface of the first plate-shaped object. The other end of the shaft is bonded to one main surface of the second plate-shaped object. The head is bonded to the other main surface of the second plate-shaped object. In a view from a direction in which the shaft-shaped object extends, the first plate-shaped object is larger than the shaft-shaped object, and the second plate-shaped object is larger than the first plate-shaped object.

The second aspect of the present invention is such that technical matter is added to the first aspect of the invention. In the second aspect of the present invention, the first plate-shaped object and the second plate-shaped object are circular plate-shaped objects.

A third aspect of the present invention relates to a band-clip-equipped wire harness.

In the third aspect of the present invention, the band clip and the wire harness according to the first or second aspect of the present invention are provided. The wire harness is bundled by a bundling band.

A fourth aspect of the present invention relates to an assembly.

In the fourth aspect of the present invention, the band clip and the wire harness according to the first or second aspect of the present invention and a floor carpet are provided. The wire harness is bundled by the bundling band. A slit is formed in the floor carpet. The floor carpet is sandwiched between the first plate-shaped object and the second plate-shaped object. The shaft-shaped object penetrates through the slit.

Advantageous Effects of Invention

According to the present invention, in the case where the clip is bonded to a sheet-shaped object, the flat first plate-shaped object is arranged on one main surface side of the sheet-shaped object. The projection of the band clip from the sheet-shaped object is suppressed.

Also, a second plate-shaped object restricts movement of the clip from the other main surface to the one main surface of the sheet-shaped object. The projection of the band clip from the sheet-shaped object is suppressed.

In particular, according to the fourth aspect of the present invention, the number of man-hours for attaching the wire harness and the floor carpet is reduced.

These and other objects, characteristics, aspects, and benefits of the present invention will become more evident from the detailed description of the present invention below when considered along with the accompanying drawings.

DESCRIPTION OF EMBODIMENTS

Figure 1:
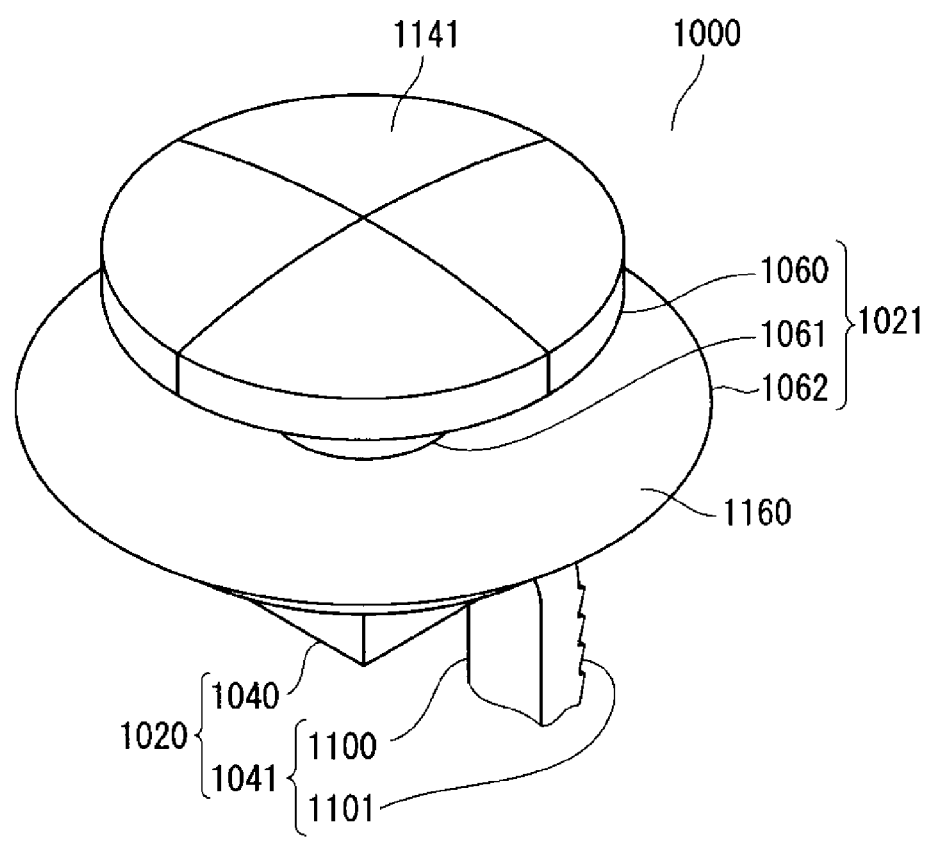
FIG. 1 is a perspective view of a band clip.
Figure 2:
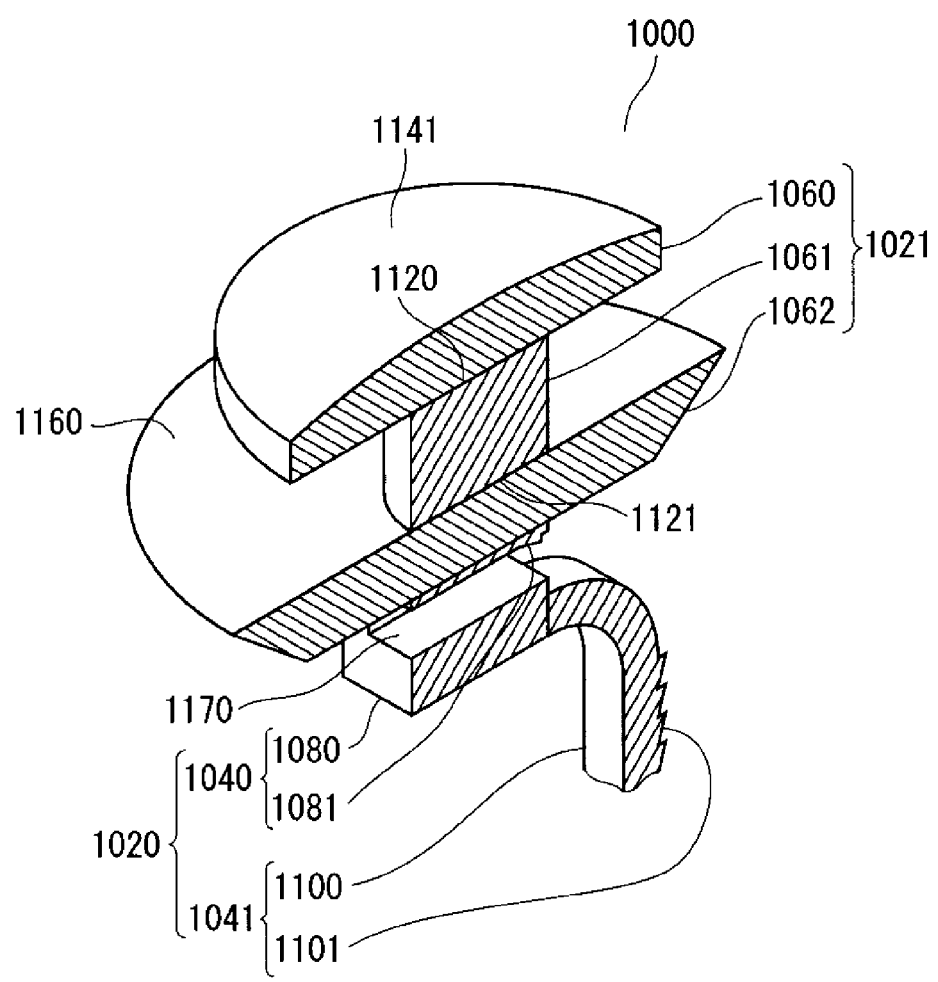
FIG. 2 is a perspective view of a band clip.
Figure 3:
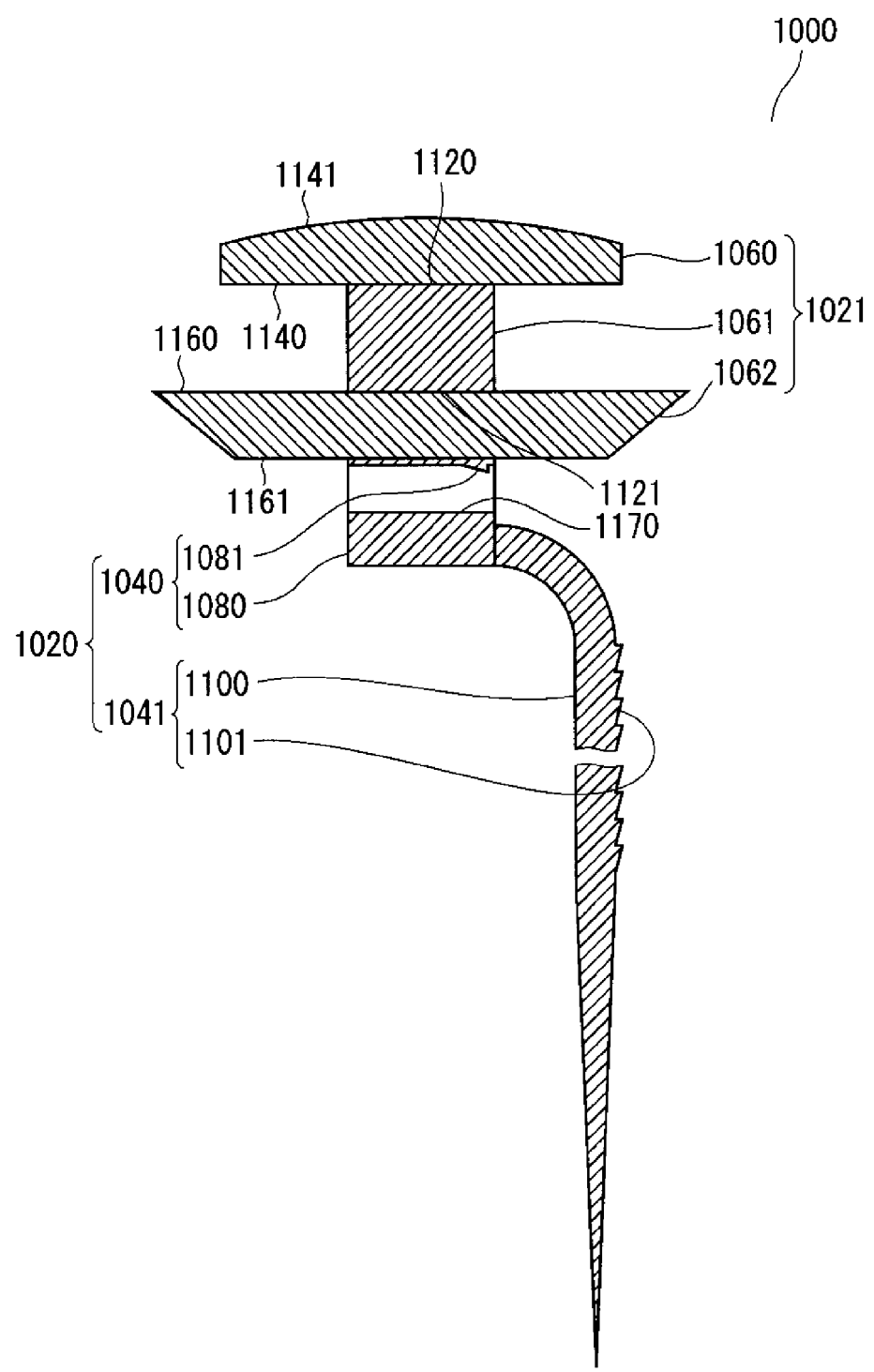
FIG. 3 is a cross-sectional view of a band clip.

The perspective view shown in FIG. 1, the perspective view shown in FIG. 2, and the cross-sectional view shown in FIG. 3 schematically show a band clip 1000 of the present embodiment. FIG. 2 shows a state in which the band clip 1000 has been cut in half along a longitudinal plane.

As shown in FIGS. 1 to 3, the band clip 1000 includes a bundling band 1020 and a clip 1021. The bundling band 1020 includes a head 1040 and a strap 1041. The clip 1021 includes a button 1060, a shaft 1061, and a penetration inhibitor 1062. The head 1040 includes a passage-forming object 1080 and a retaining hook 1081. The strap 1041 includes a belt-shaped portion 1100 and multiple projections 1101. The band clip 1000 may include components other than these. The number of the multiple projections 1101 may be increased or reduced. The bundling band 1020 is to bundle a wire harness. The clip 1021 is to be bonded to a floor carpet. The bundling band 1020 may bundle a linear object other than a wire harness. The clip 1021 may be bonded to a sheet-shaped object other than a floor carpet.

The button 1060 and the penetration inhibitor 1062 are circular plate-shaped objects. Both or one of the button 1060 and the penetration inhibitor 1062 may be a plate-shaped object that is not a circular plate-shaped object. For example, both or one of the button 1060 and the penetration inhibitor 1062 may be an ovoid plate-shaped object.

The thickness of the button 1060 is at its thickest in the center and becomes thinner as the edge is approached. The distribution of the thickness of the button 1060 may be changed.

One main surface 1140 of the button 1060 is flat, and the other main surface 1141 of the button 1060 curves smoothly. The one main surface 1140 of the button 1060 is perpendicular to the shaft 1061. If the clip 1021 is bonded to a sheet-shaped object, almost the entirety of the one main surface 1140 of the button 1060 is in contact with the main surface of the sheet-shaped object.

The thickness of the penetration inhibitor 1062 is constant from the center thereof to the vicinity of the edge and becomes thinner from the vicinity of the edge to the edge as the edge is approached. The distribution of the thickness of the penetration inhibitor 1062 may be changed.

The one main surface 1160 of the penetration inhibitor 1062 is flat, and the other main surface 1161 of the penetration inhibitor 1062 is flat from the center thereof to the vicinity of the edge. The one main surface 1160 of the penetration inhibitor 1062 is perpendicular to the shaft 1061. When the clip 1021 is bonded to the sheet-shaped object, almost the entirety of the one main surface 1160 of the penetration inhibitor 1062 is in contact with the main surface of the sheet-shaped object.

The shaft 1061 is a round shaft. The shaft may be replaced with a shaft that is not a round shaft. For example, the shaft 1061 may be replaced with a square shaft. The shaft 1061 extends in a straight line.

One end 1120 of the shaft 1061 is bonded to the center of the one main surface 1140 of the button 1060. The one end 1120 of the shaft 1061 may be bonded to a position shifted slightly from the center of the one main surface 1140 of the button 1060. The other end 1121 of the shaft 1061 is bonded to the center of the one main surface 1160 of the penetration inhibitor 1062. The other end 1121 of the shaft 1061 may be bonded to a position shifted slightly from the center of the one main surface 1160 of the penetration inhibitor 1062. The head 1040 is bonded to the other main surface 1161 of the penetration inhibitor 1062.

The one main surface 1140 of the button 1060 is parallel with the one main surface 1160 of the penetration inhibitor 1062.

In a view from the direction in which the shaft 1061 extends, the button 1060 is larger than the shaft 1061 and the penetration inhibitor 1062 is larger than the button 1060.

A strap passage 1170 is formed in the passage forming object 1080. The retaining hook 1081 projects from the inner surface of the strap passage 1170. The multiple projections 1101 are bonded to a main surface of the belt-shaped portion 1100, project from the main surface of the belt-shaped portion 1100, and are aligned in the length direction of the belt-shaped portion 1100.

The bundling band 1020 and the clip 1021 are made of resin. All or a portion of the bundling band 1020 and the clip 1021 may be made of a material other than resin.

Figure 4:
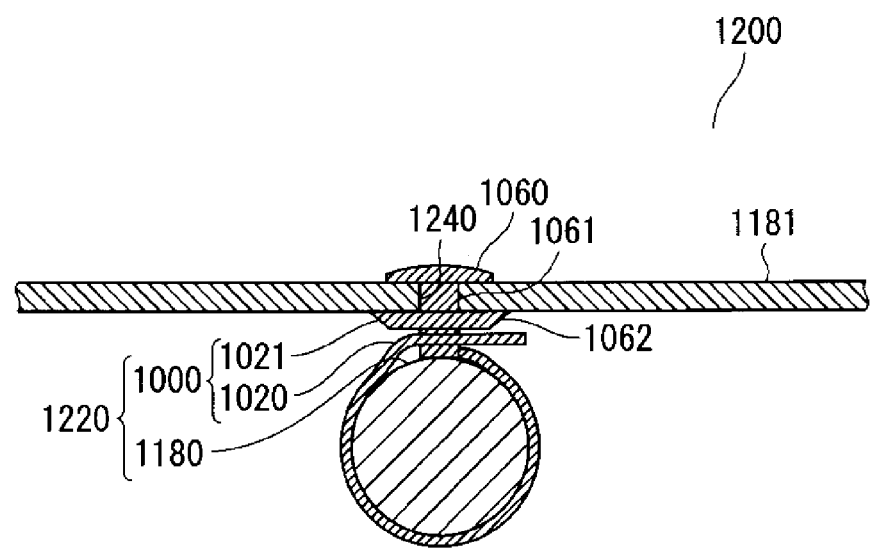
FIG. 4 is a cross-sectional view of an assembly.
Figure 5:
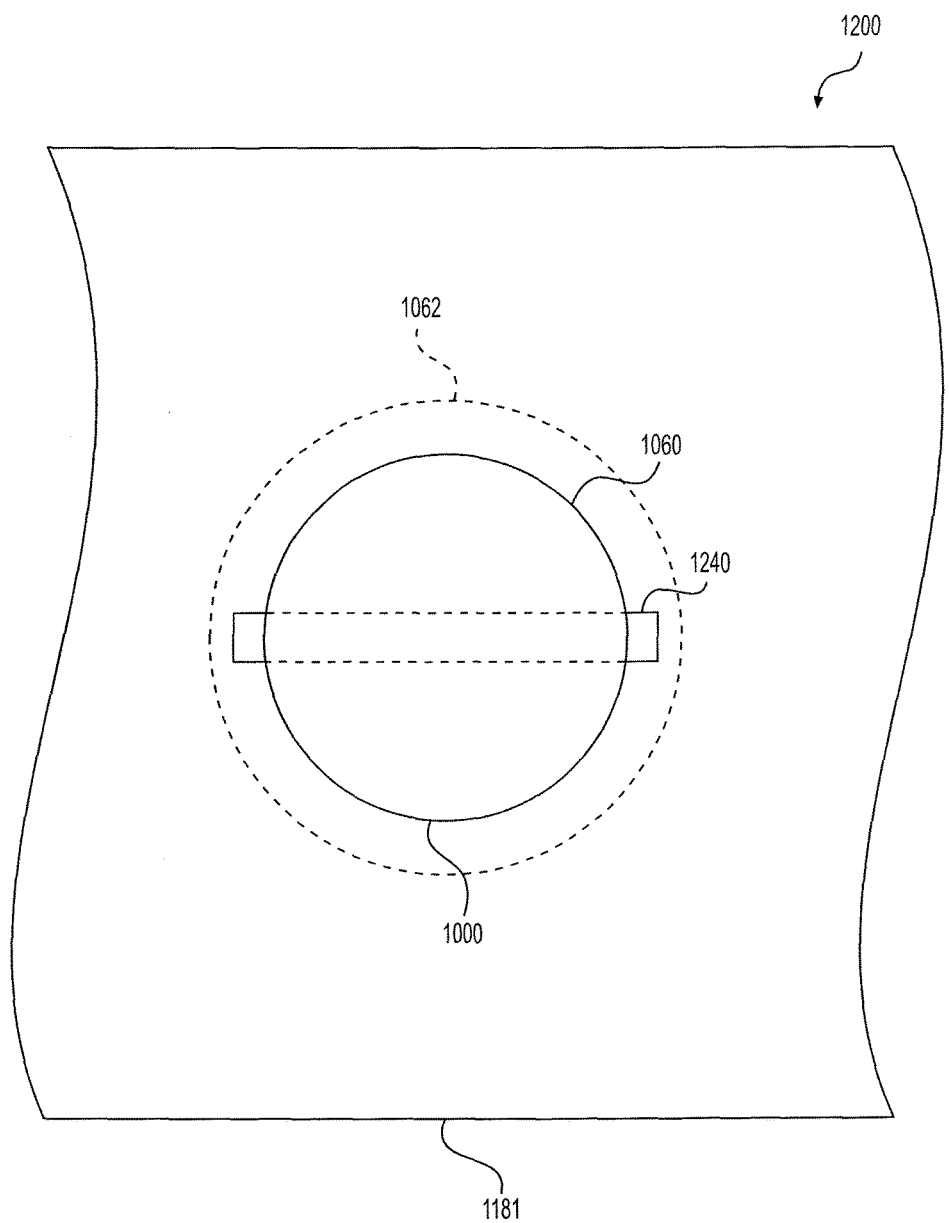
FIG. 5 is a top view of an assembly.

The cross-sectional view shown in FIG. 4 and the top view shown in FIG. 5 schematically show an assembly 1200 of the band clip 1000, a wire harness 1180, and a floor carpet 1181.

The assembly 1200 is laid on the floor of a vehicle cabin of an automobile. When the assembly 1200 is laid on the floor of a vehicle cabin of an automobile, the wire harness 1180 is arranged closer to the vehicle body side than the floor carpet 1181 is. The assembly 1200 may be laid somewhere other than on the floor of a vehicle cabin of an automobile. According to the assembly 1200, the number of man-hours for attaching the wire harness and the floor carpet is reduced.

As shown in FIGS. 4 and 5, with the assembly 1200, the wire harness 1180 is bundled by the bundling band 1020, and the clip 1021 is bonded to the floor carpet 1181.

When the wire harness 1180 is bundled by the bundling band 1020, the strap 1041 is passed through the strap passage 1170 so as to form the strap 1041 into a ring. The wire harness 1180 is constricted by the ring of the strap 1041. One of the multiple projections 1101 catches on the retaining hook 1081, whereby the strap 1041 is restricted from coming out from the strap passage 1170. Accordingly, a band-clip-equipped wire harness 1220 is formed, and the state in which the wire harness 1180 is bundled by the bundling band 1020 is maintained.

A slit 1240 is formed in the floor carpet 1181. When the clip 1021 is bonded to the floor carpet 1181, the slit 1240 is expanded and the button 1060 is passed through the slit 1240, similarly to a case of attaching a button for clothing. The button 1060 and the penetration inhibitor 1062 sandwich the floor carpet 1181. The shaft 1061 penetrates through the slit 1240. The edge of the button 1060 that first enters the slit when the button 1060 is passed through the slit 1240 is thin, making it easier to perform the task of passing the button 1060 through the slit 1240.

When the clip 1021 is bonded to the floor carper 1181, the flat button 1060 is arranged on the vehicle cabin side. For this reason, projection of the band clip 1000 from the floor carpet 1181 is suppressed. Also, the penetration inhibitor 1062 restricts movement of the band clip 1000 from the vehicle body side to the vehicle cabin side. For this reason, projection of the band clip 1000 from the floor carpet 1181 is suppressed. Accordingly, projection of the band clip 1000 into the vehicle cabin is suppressed.

It is desirable that the length of the slit 1240 is longer than the diameter of the button 1060 and shorter than the diameter of the penetration inhibitor 1062. Accordingly, it is easier to pass the button 1060 through the slit 1240, and it is more difficult to pass the penetration inhibitor 1062 through the slit 1240. A case in which the penetration inhibitor 1062 passes through the slit 1240 and the band clip 1000 projects into the vehicle cabin is not likely to occur.

The one main surface 1160 of the penetration inhibitor 1062 is flat, and the entirety of the one main surface 1160 of the penetration inhibitor 1062 is in contact with the main surface of the floor carpet 1181 on the vehicle body side. Accordingly, it is more difficult to pass the penetration inhibitor 1062 through the slit 1240.

The length of the shaft 1061, or in other words, the distance from the one main surface 1140 of the button 1060 to the one main surface 1160 of the penetration inhibitor 1062 is the same as the thickness of the floor carpet 1181. For this reason, the floor carpet 1181 does not move between the button 1060 and the penetration inhibitor 1062, and the clip 1021 is stably fixed to the floor carpet 1181.

The wire harness 1180 electrically connects two or more devices mounted in the automobile. The wire harness 1180 typically branches so as to electrically connect three or more devices. The wire harness 1180 electrically connects two or more devices without branching in some cases as well.

Although the present invention has been described in detail, the description above is in all aspects exemplary and not limiting. Accordingly, it is understood that any number of changes or modifications can be conceived without departing from the gist of the present invention.

LIST OF REFERENCE NUMERALS

1000 Band clip
1020 Bundling band
1021 Clip
1040 Head
1041 Strap
1060 Button
1061 Shaft
1062 Penetration inhibitor

The invention claimed is:

1. A band clip assembly comprising:
a bundling band including a head and a strap;
a clip including a first plate-shaped object, a second plate-shaped object, and a shaft-shaped object, the first plate-shaped object having a first main surface and a second main surface, the second plate-shaped object having a third main surface and a fourth main surface, the shaft-shaped object having a first end and a second end, the first end being bonded to the first main surface, the second end being bonded to the third main surface, and the head being bonded to the fourth main surface,
wherein, when viewed from a direction in which the shaft-shaped object extends, the first plate-shaped object is larger than the shaft-shaped object and the second plate-shaped object is larger than the first plate-shaped object,
the third main surface of the second plate-shaped object is a flat surface, and
the fourth main surface of the second plate-shaped object includes a flat portion from a center to a vicinity of an edge of the second plate-shaped object, and a portion of the second plate-shaped object becomes thinner from the vicinity of the edge of the second plate-shaped object to the edge of the second plate-shaped object,
a wire harness bundled by the bundling band; and
a floor carpet in which a slit is formed, the floor carpet being sandwiched between the first plate-shaped object and the second plate-shaped object, and the shaft-shaped object penetrating through the slit, and
a length of the slit is longer than a diameter of the first plate-shaped object, and the length of the slit is shorter than a diameter of the second plate-shaped object.

2. The band clip assembly according to claim 1, wherein the first plate-shaped object and the second plate-shaped object are circular plate-shaped objects.

* * * * *